United States Patent Office 3,508,255
Patented Apr. 21, 1970

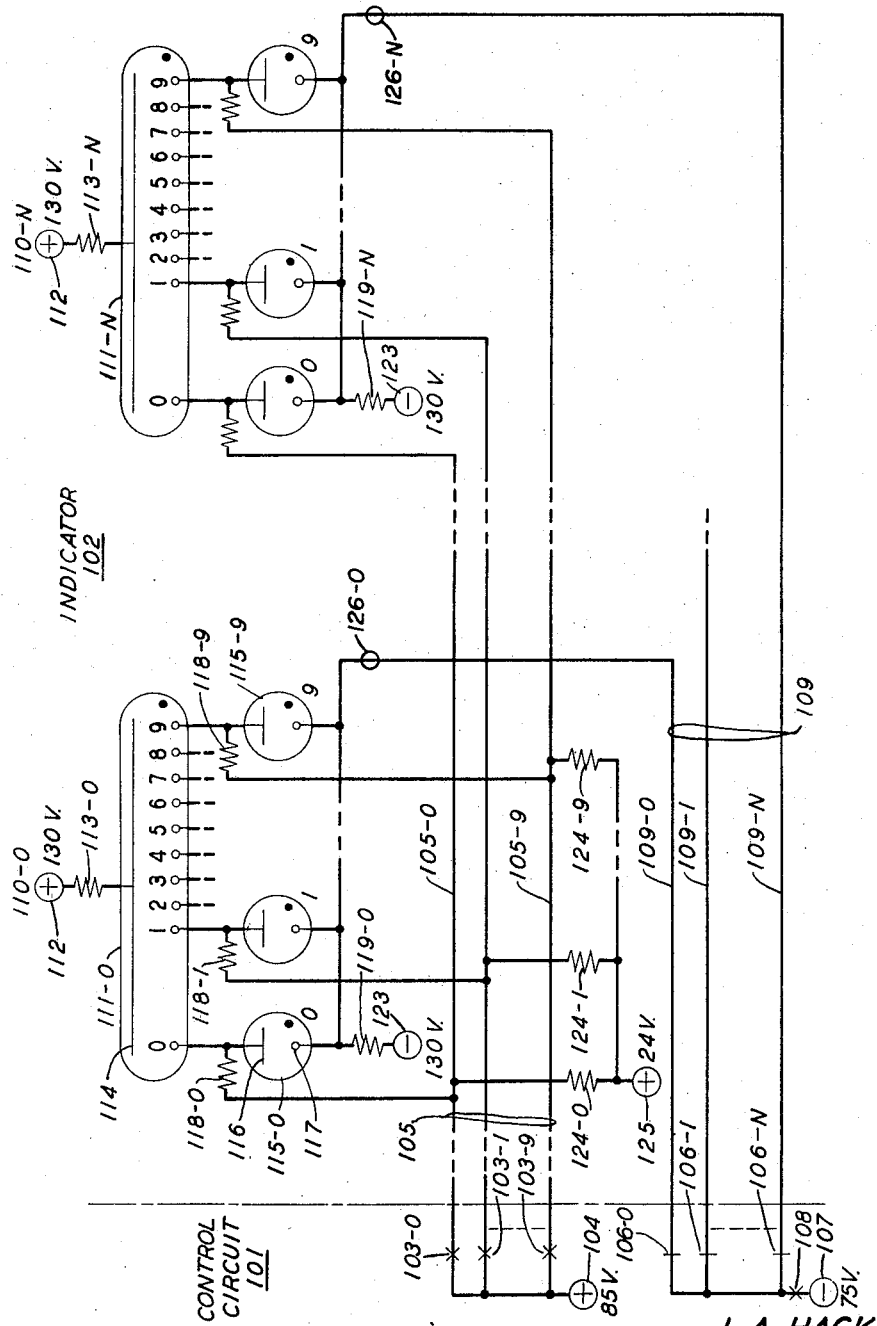

3,508,255
PLURAL ORDER VISUAL INDICATOR
John A. Hackett, Matawan, and George Riddell, Lincroft, N.J., assignors to Bell Telephone Laboratories, Incorporated, Murray Hill and Berkeley Heights, N.J., a corporation of New York
Filed Aug. 30, 1967, Ser. No. 664,359
Int. Cl. G08b 5/00
U.S. Cl. 340—372                                    4 Claims

ABSTRACT OF THE DISCLOSURE

A remotely controlled plural order indicator is disclosed which uses gaseous type indicator tubes to display numerical data. The information to be displayed is applied sequentially, digit by digit, over a bus common to all orders. A steering circuit, also remotely controlled, causes the sequentially received digits to be displayed by the tubes of successive orders. Neon tubes are used as its two state elements to lock in an initiated display when the steering circuit advances to the next order.

BACKGROUND OF THE INVENTION

This invention relates to an indicator and, in particular, to a plural order visual indicator that may be remotely operated to display numerical or alphanumerical information.

Typical applications of visual indicators include the read out or display of numerical or alphanumerical information in connection with electronic computers, display boards, telephone operator positions and the like. In connection with the remote operation of these devices, it is usually advantageous, for reasons of economy, that the number of conductors between the display apparatus and the remotely situated control equipment be held to a minimum. Also, since remotely operated indicators are often installed in environments which render maintenance difficult and expensive, it is generally desirable that they be equipped with apparatus that is as trouble free as is practicable. To this end, it is desirable to avoid the use of relays, rotary stepping switches, and other apparatus containing moving parts that require routine maintenance.

The requirement that the number of control conductors be minimized and the requirement that component reliability be increased by avoiding the use of electromechanical devices, are mutually exclusive insofar as concerns the indicators presently available. Thus, indicators which contain a minimum of moving parts normally require an increased number of control conductors so that the control apparatus may have access to all orders of the indicator; indicators that require a minimum of control conductors normally use relays, stepping switches, or other comparable elements so that the conductors may be sequentially associated with the different indicator orders. The currently available indicators are therefore less than ideal since they either require the use of moving parts or a large number of control conductors.

It is an object of our invention to provide an improved indicator.

It is a further object to provide a remotely controllable indicator that uses components of increased reliability and requires a minimum of control conductors for its operation.

BRIEF SUMMARY OF THE INVENTION

Our invention overcomes the problems inherent to the currently available indicators in that it requires only a minimum number of control conductors and, at the same time, reduces maintenance requirement by using neon tubes in place of relays and switches.

Each order of our indicator uses as a display device a gaseous discharge tube that has an anode and a plurality of cathodes each of which is configured in the shape of a numeral or character to be displayed. The display of a selected character is effected by the application of suitable potentials to the anode and the cathode representing the selected character. The remote operation of our indicator to display numerical information requires only the provision of a conductor individual to each different character that is to be displayed together with a conductor individual to each order. Thus, twenty-two conductors would be required for a twelve order numerical indicator. Ten of the conductors would comprise input conductors each of which would individually represent one of the numerals 0 through 9. Each of the remaining twelve conductors would be individual to a different order of the indicator. The first group of conductors may for convenience be referred to as the numerical input conductors since each represents one of the numerals 0 through 9, and since signals specifying the numerals to be displayed are applied to these conductors by the control apparatus. The second group may be referred to as the steering conductors since they receive the signals that steer the numerals that are to be displayed into the successive indicator orders.

Each input conductor is connected, via a potential dropping resistor, to the display cathode in each tube that represents the numeral associated with the conductor; for example, input conductor 0 is connected to the 0 configured cathode in each tube. Similarly, input conductor 9 is connected to the 9 cathode of each tube. In the operation of our invention, a positive pulse is applied to one of the input conductors 0 through 9, to initiate a numerical display by a given indicator tube. Although each input conductor is connected to all tubes, a tube can respond to an input pulse only when its indicator order is concurrently energized with a negative potential on its steering conductor. In order to steer each numeral to a selected order of the indicator, the steering conductor for the order is primed with a negative potential concurrently with the application of the positive pulse to the input conductor. With this arrangement, the control apparatus effects numerical displays in the successive indicator orders by applying signals to the input conductors, one at a time, and by energizing the steering conductors sequentially with a negative potential. Each concurrent application of a positive signal to an input conductor and a negative potential to a steering conductor effects a display by a cathode of the order common to the two conductors.

The circuit of our invention uses a plurality of neon tubes in each order as two-state memory and control devices. Each neon tube is individual to a different display tube cathode and each functions to initiate and maintain a display by its associated cathode. One side of each neon tube is connected to the junction of its associated display cathode and the resistor which connects the corresponding numerical input conductor to the cathode. The other side of each neon tube is connected to the steering conductor for its indicator order. A display by a particular cathode is effected by first breaking down and firing the neon tube to which the cathode is connected. The breakdown of the neon tube raises the potential between the selected cathode and anode of the display tube to the level required to effect a display of the selected numeral.

Each neon tube is effectively in series between the input conductor connected to its associated display cathode and the steering conductor for its order. The potential required to fire any neon tube is such that a positive going pulse must appear on the input conductor to which it is connected coincidentally with the application of a negative potential to its steering conductor. The application of either potential alone is not sufficient. When it is desired to initiate a selected display in a particular tube, the control equipment applies a priming potential to the steering conductor for the tube and a positive pulse to the input conductor representing the numeral to be displayed. The coincident application of these two potentials breaks down and fires the neon tube common to the two conductors and individual to the display tube cathode that is to be energized. The negative potential on the steering conductor is then applied via the conducting neon tube to the display tube cathode to effect a display of the numeral represented by it. For example, if it is desired to initiate the display of a 1 by the first order, a negative priming potential is applied by the control apparatus to the steering conductor for the order and a positive input pulse is applied to input conductor 1. The input pulse on the conductor is, in turn, applied by it to the 1 cathode of each display tube and to the neon tube individual to each such cathode. The potential across the neon tube connected to the 1 cathode of the first order is increased at this time by virtue of the negative steering potential also applied to it and therefore, this neon tube breaks down and conducts. The steering conductors for the other orders are not currently energized and thus, the other neon tubes to which input conductor 1 is connected do not fire at this time. Subsequently, upon the termination of the input pulse, the gap between the anode and cathode 1 of the display tube for the first order breaks down and initiates a display of the digit 1. The series circuit by means of which this display is initiated comprises a positive potenal on the anode of the display tube, cathode 1 of the tube, the conducting neon tube, and the negative potential on the steering conductor.

When a display has been affected in the first order, the control circuit advances the steering circuit by reducing the potential on the steering conductor for the first order and by applying the negative priming potential to the steering conductor of the next order in which a display is to be initiated. The reduced potential on the steering conductor of the first order maintains the currently conducting neon tube of this order in ON condition since, as is characteristic for gas tubes, a lesser potential is required to sustain conduction than is required to initiate it.

For the most purposes, it is usually desired to initiate numerical displays sequentially in successive indicator orders. Therefor, the control apparatus, following the entry of a display in the first order, advances and places a negative priming potential on the steering conductor for the second order and, at the same time, applies a positive pulse to the input conductor representing the numeral that is to be displayed by the second order. This input pulse is applied over the conductor to a display cathode in every order and in turn to the neon tube to which each such cathode is connected. Since only the steering conductor for the second order is primed with a negative potential at this time, only the neon tube in the second order common to the energized input conductor and the primed steering conductor has a sufficient potential across it to break down and conduct. Immediately upon the termination of the input pulse, the conducting neon tube in the second order initiates a display of the selected numeral in the same manner described for the first order.

The operation of the circuit continues in a similar manner with the control apparatus priming the steering conductors of the successive orders sequentially so that the pulses applied to the input conductors initiate a display of the selected numerals in successive indicator orders.

Our circuit minimizes its dependence upon neon tube tolerances by maintaining a low potential across each neon tube except at such times when it is desired to initiate a display by its cathode. In particular, when a display is to be initiated, the sum of the potentials applied to the steering conductor of the selected order and the input conductor for the selected numeral are considerably in excess for the firing potential required for the neon tube common to the two conductors. The firing of tube is thereby assured. At the same time, the potential across every other neon tube is well below its minimum firing potential. This assures that the only neon tube that fires is the one that is connected to the selected display tube cathode.

During the interval in which a plural order display is being effected, the display in each order may, depending upon the neon tube characteristics persist only as long as the negative priming potential remains on the steering conductor for the order. When the control equipment advances the steering circuit, it applies a reduced sustaining potential to the steering conductor of the order in which a display has just been initiated, and concurrently applies the priming potential to the steering conductor for the next order. The magnitude of the sustaining potential is such that it is sufficient to maintain conduction in the neon tube that not necessarily in a display tube with firing and sustaining potential toward the upper limit of the tolerance. Therefore, the priorly initiated display in this tube is temporarily extinguished. However, as will be subsequently seen, this is of no practical importance since the display is reinitiated in less than a second when the control equipment has transmitted the last numeral to be displayed to the indicator.

Immediately following the entry into the indicator of the last numeral that is to be displayed, a potential equal to the priming potential is applied to all steering conductors. This raises the effective potential across each display tube and breaks down its anode-display cathode gap connected to the currently conducting neon tube of its order. This, in turn, reinitiates a display of the numeral represented by the display cathode connected to each conducting neon tube.

The operation of our circuit in the foregoing manner wherein an initiated display is temporarily extinguished and is not reinitiated until the end of the numeral selection operation, permits a low potential to be applied to the neon tubes that are not to be fired during a numeral selection operation and at the same time, permits a relatively high potential to be applied to the neon tube that is to be fired. The difference between the potentials applied to the selected and the nonselected tubes with this mode of operation is far greater than would be possible if it were also necessary to ensure that an initiated display in a prior order is maintained as displays are effected in subsequent orders.

A feature of our invention is the provision of a plural order indicator having a plurality of numerical input conductors connected in common to the corresponding elements of each order together with the steering circuit comprising a steering conductor individual to each order.

A further feature is the provision of a plural order indicator in which numerical displays are effected by applying numerical selection pulses in common to all orders and by concurrently applying a steering potential only to the order that is to display the selected numeral.

A further feature is the provision of a plurality of two-state memory elements for each order each of which elements is individual to a numeral that may be displayed by the order and is connected between the steering circuit conductor of the order and the input conductor representing its associated numeral.

A further feature is the provision of a steering circuit which applies a relatively high priming potential to the steering conductor of each order when a numeral is to be entered therein, which subsequently applies a lower sustaining potential to each steering conductor subsequent to the entry of a numeral therein, and which subsequently reapplies a high priming potential to all steering conductors.

A further feature is the provision of neon tubes which are normally nonconductive, which are selectively broken down and caused to conduct when a numeral is entered into each order, and which serve as memory elements to reinitiate a display of the selected numeral in each order when a priming potential is reapplied to all steering conductors subsequent to the termination of the numeral selection operation.

These and other objects and features may be more fully understood when taken in conjunction with the following description and drawing which illustrates the circuit details of our invention.

DETAILED DESCRIPTION

With reference to the single figure, our indicator system comprises a control circuit 101 and a remotely situated plural order indicator 102. The indicator is shown having $N+1$ orders designated 110–0 through 110–N. The control circuit and the remote indicator are interconnected by a group of numeral representing input conductors 105 and a group of steering conductors 109. Conductor group 105 contains conductors 105–0 through 105–9, each of which is individual to one of the digits 0 through 9 that may be displayed in any order. The conductor group 109 comprises conductors 109–0 through 109–N, each of which is the steering conductor for one of orders 0 through N.

The normally open switches 103–0 through 103–9 enable the 85-volt positive potential from source 104 to be applied to selected ones of input conductors 105. The normally closed switches 106–0 through 106–N and the normally open switch 108 permits, in the manner subsequently described, the negative 75 volt potential from source 107 to be applied to selected ones of the steering conductors 109.

Each order of the indicator includes a multi-cathode display tube, a neon tube for each display tube cathode, together with the resistors required to connect these elements to sources of operating potential. For example, the 0 order includes display tube 111–0 and the ten neon tubes 115–0 through 115–9. Anode 114 of the display tube is connected by resistor 113–0 to the positive 130 volt source of potential 112. The ten cathodes of tube 111–0 are designated 0 through 9 in accordance with the numeral represented by each cathode. Each of these cathodes is connected to the anode 116 of the corresponding one of neon tubes 115–0 through 115–9. Each display tube cathode is also connected by one of resistors 118–0 through 118–9 to one of input conductors 105–0 through 105–9. The cathodes 117 of neon tubes 115–0 through 115–9 are connected together and in turn to one side of resistor 119–0. The other side of the resistor is connected to the negative 130 volt source of potential 123. The cathodes of the neon tubes are connected to common terminal 126–0 and, in turn, to the steering conductor 109–0 for the 0 order.

Each input conductor 105 is connected by means of one of resistors 124–0 through 124–9 to the positive 24 volt source of potential 125.

Each of the remaining orders of the indicator, including order N, contains components and interconnections comparable to that described for order 0.

During the normal or idle condition of the indicator, i.e., when no display is currently being initiated or maintained, switches 103–0 through 109–9 are open, switch 108 is open, and switches 106–0 through 106–N are closed. At such times, the input conductors 105 are maintained at a plus 24 volt potential by means of resistors 124–; the steering conductors 109– and the neon tube cathodes are maintained at a negative 130 volt potential by means of resistor 119–0 for orders 0 and the corresponding resistor in every other order, and resistor 118– of order 0, and the corresponding resistors in every other order, maintain the anodes of the neon tubes at the plus 24 volt potential applied to the input conductors 105.

The idle state condition of the circuit maintains approximately 106 volts (130 minus 24) across each display tube and 154 volts (24 plus 130) across each neon tube. No tube breaks down and conducts under these conditions since the minimum firing potential of the display tubes is approximately 175 volts, while that of the neon tubes is approximately 170 volts.

The following describes the manner in which numerical information is selectively applied to the conductors 105 and entered into the successive orders of the indicator. First, switch 108 is closed to apply the negative 75 volt potential from source 107, through switches 106, to each of the steering conductors 109–0 through 109–N.

Subsequently, in the event it is desired to initiate the display with the 0 order, switch 106–0 is opened and concurrently therewith, one of the switches 103–0 through 103–9 is closed in accordance with the numeral that is to be displayed. Let it be assumed that a "1" is to be entered into the 0 order. This being the case, switch 103–1 is operated concurrently with the operation of switch 106–0. The operation of switch 106–0 opens its break contacts, disconnects the negative 75 volt potential from conductor 109–0 which, in turn, permits the negative 130 volt potential from source 123 to be applied through resistor 119–0 to the cathodes of neon tubes 115–0 through 115–9. The concurrent operation of switch 103–1 closes its make contacts to apply the positive 85 volt source potential from source 104 to conductor 105–1. This potential is, in turn, applied via resistor 118–1 to cathode 1 of the display tube and the anode of neon tube 115–1. The potential on conductor 105–1 is also applied to the corresponding display cathode and neon tube in every other order of the indicator.

Neon tube 115–1 breaks down and conducts when switch 103–1 is initially closed since the positive 85 volt potential on its anode and the negative 130 volt on its cathode together exceed its minimum firing requirement of 170 volts. As already mentioned, the 85 volt potential on conductor 105–1 at this time is also applied to the anode of the corresponding neon tube in every other order. However, the negative 75 volt potential on the steering conductors 109–1 through 109–N is applied to the cathodes of the neon tubes in these orders. The plus 85 volt potential on its anode and the negative 75 volt potential on its cathode does not exceed 170 volts and the neon tube connected to input conductor 1 in each of orders 1 through N does therefore, not break down and conduct at this time.

The sustaining potential of the neon tubes is approximately 70 volts. Thus, when switch 103–1 is subsequently released, and prior to the time that switch 106–0 is released, the negative 130 volt potential from source 123 is extended through the conducting neon tube 115–1 and, because of the sustaining potential drop within the tube, appears as approximately a negative 60 volt potential on cathode 1 of display tube 111–0. Tube 111–0 breaks down and momentarily displays the numeral "1" at this time by virtue of the negative potential on its cathode 1 and the positive 130 volt potential on its anode through resistor 113–0. The display persists only momentarily since, shortly after the release of switch 103–1, switch 106–0 is released and switch 106–1 is operated to prepare the circuit for the entry of a numeral into the next order.

The release of switch 106–0, following the entry of a 1 into order 0, reapplies the negative 75 volt potential to steering conductor 109–0, and in turn to the cathodes of the neon tubes in order 0. This reduces the potential on the neon cathodes from minus 130 volts via resistor 119–0 to that of minus 75 from the steering conductor. The minus 75 volts on the neon tube cathodes in order 0 lowers the effective potential across the series circuit comprising neon tube 115–1, the cathode 1-anode gap of the display tube and the positive 130 volt source. This effective potential is no longer sufficient to maintain conduction in both the neon and the display tube. The conduction in the display tube now terminates while that in neon tube 115–1 continues due to the 24 volts applied to its anode from source 125 via resistor 124–1.

The operation of switch 106–1 opens its break contacts which, in the same manner already described for order 0 and switch 106–0, removes the negative 75 volt potential from steering conductor 109–1. This changes the potential on the cathodes of the neon tubes of order 1 from minus 75 to minus 130 volts. The subsequent operation of one of switches 103 applies a positive 85 volt potential to the conductor 105 associated with the operated switch and, in the same manner as already described, fires the neon tube in order 1 connected to this conductor. The subsequent release of the operated switch 103 effects a momentary display of the selected numeral by within order 1. This display, however, as described for order 0, is only momentary and is extinguished when switch 106–1 is subsequently released and the subsequent switch 106– is operated in preparation for the entry of a numeral into the next order. Although the display in order 1 is extinguished at this time, the conducting neon tube of the order remains in an ON condition.

The circuit operations continue in a similar manner for the entry of selected numerals into the subsequent orders. Finally, switch 106–N is operated concurrently with one of switches 103– in order to enter a numeral into the Nth order of the indicator.

When the selected numeral has been entered into the Nth order, switch 106–N is released together with switch 108. The release of switch 108 opens its break contacts, isolates all steering conductors from the negative 75 volt source of potential, and permits the negative 130 volt potential source 123 in such order to be reapplied to the cathodes of all neon tubes. This increases the resultant potential across the series circuit, in each order comprising, the conducting neon tube, the corresponding anode-cathode gap of its display tube and the positive 130 volt potential. The sum of these two potentials is effective to reinitiate a display of the numeral associated with the neon tube in each order that is currently in a conductive state. For example, since it was assumed that a 1 was entered into the 0 order, neon tube 115–1 is currently in a conductive state. The reapplication of the negative 130 volt potential to its cathode when switch 108 is released places a sufficient potential across the cathode 1-anode gap of tube 111–0 to reinitiate the display of the numeral 1. In a similar manner, the display of the numeral associated with the conductive neon tube in every other order is reinitiated at this time.

The fact that an initiated display within an order is temporarily extinguished until a numeral has been entered in all orders is not disadvantageous, since if switches 103 are operated automatically by relay circuitry rather than manually, the time required to complete a 12 order display, for example, will be somewhat less than 500 milliseconds. This period of time is sufficiently short that the initial illumination, the subsequent extinguishment, followed by the steady illumination of a display in each order is too fast for the eye to follow and the display effectively appears to be initiated in all orders upon the termination of the numeral selection operation.

The operation of our circuit in such a manner that an initiated display in an order is temporarily extinguished enables a greater percentage of the available operating potentials to be used in the selection process for the neon tubes of subsequent orders. This mode of operation permits low cost wide tolerance neon tubes to be used. For example, our circuit can accommodate neon tubes having a firing potential in the range of 170 to 200 volts. Tubes of this type are relatively inexpensive and at the current time large quantities can be obtained for less than ten cents each. If our circuit were operated in such a manner that an initiated display is maintained during the time displays are initiated in subsequent orders, a lesser percentage of the available potentials would be available for use in the selection process and therefore closer tolerance, and consequently far more expensive neon tubes would be required.

It is to be understood that the above described arrangements are merely illustrative of the numerous and varied other arrangements which may constitute applications of the principles of the invention. Such other arrangements may be readily devised by those skilled in the art without departing from the spirit or scope of this invention.

What is claimed is:

1. A plural order character indicator apparatus comprising
    a gaseous discharge indicator tube for each said order, each said indicator tube having a plurality of character indicating elements,
    a plurality of two electrode breakdown discharge devices, a first electrode of each of said devices being connected to a respective one of said character indicating elements and the other electrode connected to a common point within each said order, said indicator tubes and said discharge devices exhibiting breakdown and sustaining potentials said breakdown potential being higher than said sustaining potential,
    means for applying a first source of potential to each said common point, said first potential being sufficient to sustain conduction serially through one of said indicator tubes and one of said discharge devices whose breakdown potential has been supplied,
    order select means for selectively shunting down said first source of potential in all but a selected one of said orders and for substituting therefor a potential insufficient to sustain said serial conduction,
    character select means operative simultaneously with said order select means for applying said breakdown potential to a selected one of said breakdown devices,
    means for applying a potential to sustain conduction in said selected device, said order select means and said character select means thereafter being re-operable throughout the remaining ones of said orders, and
    means for disabling said order select means to restore said first source potential to each said common point thereby causing said indicator tube in each order having a conductive discharge device to breakdown and display the character associated with said respective device.

2. A plural order character indicator apparatus comprising
    a gaseous discharge character indicator tube for each said order, each said indicator tube having a plurality of character indicating elements,
    a plurality of two electrode breakdown discharge devices one electrode of each of said devices being connected to a respective one of said character indicating elements and the other electrode of each of said breakdown devices for a given one of said indicator tubes being connected to a common point,
    means for applying a sustaining voltage to said common point said voltage having a magnitude sufficient to sustain serial conduction through said indicator tube and one of said discharge devices after said one of said devices has been rendered conductive,
    order select means for selectively shunting down said sustaining voltage means in all but a selected one of said orders,
    character select means operative simultaneously with said order select means for applying a breakdown potential to a selected one of said breakdown devices, and
    means for thereafter disabling said order select means to restore said sustaining voltage means to said common point thereby causing said indicator tube in said selected one of said orders to display the character associated with said selected one of said discharge devices.

3. A plural order character indicator apparatus according to claim 2 further comprising,
 a source of second potential connected to each said one electrode, said second potential being sufficient to sustain conduction through said selected one of said devices until said sustaining voltage is restored to said common point.

4. A plural order visual indicator comprising, a plurality of display tubes each of which is individual to a different order and each of which has an anode and a plurality of numeral representing cathode elements, a plurality of numeral representing input conductors common to all of said orders, means for connecting each of said input conductors to the cathode in each of said tubes representing the same numeral as the input conductor, a plurality of steering conductors each of which is individual to a different order, a plurality of neon tubes each of which is individual to a different one of said cathode elements, a common junction for each order, means for individually connecting each of said cathodes in series with its associated said neon tube to the common junction of its order, each of said steering conductors being connected to the common junction for its order, a first source of a low magnitude positive potential normally connected by resistors to all of said input conductors, a second source of intermediate magnitude positive potential, first switch means for connecting said second source of positive potential to selected ones of said input conductors one conductor at a time, a priming potential comprising a third source of high magnitude negative potential, means including a resistor individual to each order for normally applying said third source of potential to the common junction and neon tubes of each order, a fourth source of intermediate magnitude negative potential, means for applying said fourth source via the steering conductor individual to each order to the common junction of the order, a second switch means individual to each order and connected to the steering conductor of its order for effectively applying a priming potential from said third source to the common junction of its order by disconnecting its steering conductor from said fourth source, the concurrent operation of the first switch means for an input conductor and the second switch means for a steering conductor being effective to fire the neon tube common to and connected in series with the two conductors, said first source and said fourth source being effective when the second switch means of an order is subsequently released to maintain conduction within a neon tube of its order that is currently in a conductive state, third switch means effective when released to remove said fourth source from all of said steering conductors, and means effective upon release of said third switch means for initiating a display by each cathode connected to a currently conducting neon tube.

References Cited

UNITED STATES PATENTS

| | | | |
|---|---|---|---|
| 2,142,106 | 1/1939 | Boswau | 315—167 X |
| 3,248,724 | 4/1966 | Deltuvia | 340—325 X |
| 3,289,038 | 11/1966 | Tsubakimoto | 315—167 X |
| 3,290,551 | 12/1966 | Cake | 315—84.6 |

JOHN W. CALDWELL, Primary Examiner

M. R. SLOBASKY, Assistant Examiner

U.S. Cl. X.R.

315—167; 340—325, 343